(12) United States Patent
Koehl et al.

(10) Patent No.: US 6,215,577 B1
(45) Date of Patent: Apr. 10, 2001

(54) METHOD AND APPARATUS FOR OPTICALLY MODULATING AN OPTICAL BEAM WITH A MULTI-PASS WAVE-GUIDED OPTICAL MODULATOR

(75) Inventors: Sean M. Koehl, Sunnyvale; Mario J. Paniccia; Dmitri Nikonov, both of Santa Clara, all of CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/435,058

(22) Filed: Oct. 25, 1999

(51) Int. Cl.$^7$ .................................................. G02F 1/03
(52) U.S. Cl. ........................... 359/261; 359/247; 359/248
(58) Field of Search ................................. 359/237, 239, 359/245, 247, 248, 250, 261, 263, 267, 276, 284, 289, 302, 310, 311

(56) References Cited

U.S. PATENT DOCUMENTS

| | | | |
|---|---|---|---|
| 3,158,746 | * 11/1964 | Lehovec ................ | 250/199 |
| 3,242,805 | * 3/1966 | Harrick ................. | 88/61 |
| 4,422,088 | 12/1983 | Gfeller ................. | 357/19 |
| 4,695,120 | 9/1987 | Holder ................. | 350/96.11 |
| 4,758,092 | 7/1988 | Heinrich et al. ........ | 356/364 |
| 4,761,620 | 8/1988 | Bar-Joseph et al. ..... | 332/7.51 |
| 4,848,880 | * 7/1989 | Aull et al. ............ | 350/355 |
| 4,865,427 | 9/1989 | Kingston et al. ........ | 350/355 |
| 4,871,224 | 10/1989 | Karstensen et al. ..... | 350/96.15 |
| 4,917,450 | 4/1990 | Pocholle et al. ....... | 350/96.11 |
| 4,966,430 | 10/1990 | Weidel ................. | 350/96.11 |
| 5,061,027 | 10/1991 | Richard ................ | 385/14 |
| 5,153,770 | 10/1992 | Harris ................. | 359/245 |
| 5,159,700 | 10/1992 | Reid ................... | 385/14 |
| 5,198,684 | 3/1993 | Sudo ................... | 257/79 |
| 5,400,419 | 3/1995 | Heinen ................. | 385/14 |
| 5,432,630 | 7/1995 | Lebby et al. .......... | 359/152 |
| 5,434,434 | 7/1995 | Kasahara et al. ....... | 257/84 |
| 5,485,021 | 1/1996 | Abe .................... | 257/84 |
| 5,502,779 | 3/1996 | Magel .................. | 385/1 |
| 5,568,574 | 10/1996 | Tanguay, Jr. et al. .. | 385/14 |
| 5,605,856 | 2/1997 | Goosen et al. ......... | 437/51 |
| 5,625,636 | 4/1997 | Bryan et al. .......... | 372/50 |
| 5,629,838 | 5/1997 | Knight ................. | 361/782 |
| 5,638,469 | 6/1997 | Feldman et al. ........ | 385/14 |

(List continued on next page.)

OTHER PUBLICATIONS

Miller, DAB: "Reason and Prospects for Dense Optical Interconnections", Presentation by Stanford University Professor, (Oct. 1997).

(List continued on next page.)

*Primary Examiner*—Georgia Epps
*Assistant Examiner*—Gary O'Neill
(74) *Attorney, Agent, or Firm*—Blakely, Sokoloff, Taylor & Zafman LLP (57) ABSTRACT

An optical modulator that modulates light through the semiconductor substrate through the back side of an integrated circuit die. In one embodiment, an optical modulator is disposed within a flip chip packaged integrated circuit die. The optical modulator includes a modulation region through which an optical beam is passed a plurality of times. In one embodiment, the optical beam enters through the back side of the semiconductor substrate at a first location and the modulated optical beam is deflected out through a second location on the back side of the semiconductor substrate. The interaction length of the optical modulator is increased by internally deflecting and passing the optical beam through the modulation region a plurality of times. In one embodiment, total internal reflection is used to deflect the optical beam. In another embodiment, reflective materials are used to internally deflect the optical beam. In one embodiment, the modulation region is provided with a charged region formed with a p-n junction. In another embodiment, the charged region is provided using metal-oxide-semiconductor type structures.

30 Claims, 4 Drawing Sheets

U.S. PATENT DOCUMENTS

| | | | |
|---|---|---|---|
| 5,696,862 | 12/1997 | Hauer et al. | 385/88 |
| 5,835,646 | 11/1998 | Yoshimura et al. | 385/14 |
| 5,864,642 | 1/1999 | Chun et al. | 385/14 |
| 5,872,360 | 2/1999 | Paniccia et al. | 250/341.4 |
| 5,963,358 * | 10/1999 | Shields | 359/248 |
| 5,966,234 * | 10/1999 | Ford et al. | 359/248 |
| 6,072,179 * | 6/2000 | Paniccia et al. | 250/341.4 |
| 6,075,908 * | 6/2000 | Paniccia et al. | 385/14 |

OTHER PUBLICATIONS

Sakano, S. et al.: "InGaAsP/InP Monolithic Integrated Circuit with Lasers and an Optical Switch," Electronics Letters, 22(11), May 1986.

Mansuripur, M. and Goodman, JW: "Signal and Noise in Magneto–Optical Readout," J. Appl. Phys., 53(6), Jun. 1982.

"Optoelectronic VLSI Foundry Services From Lucent Technologies", Lucent Technologies Bell Labs Innovations Web Page at http://www.bell–labs.com/project/oevlsi/, updated Mar. 2, 1997.

"Process for Fabricating OE/VLSI Chips", Lucent Technologies Bell Labs Innovations Web Page at http://www.bell–labs.com/project/oeflsi/wfabproc.html, updated Sep. 26, 1996.

"Detailed Design Rules for Workshop Chips", Lucent Technologies Bell Labs Innovations Web Page at http://www.bell–labs.com/roject/oevlsi/wdesrule.html, updated Mar. 7, 1997.

Cutolo, A., et al.: Sillicon Electro–Optic Modulator Based on a Three Terminal Device Integrated in a Low–Loss Single–Mode SOI Waveguide in J. of Lightwave Technology, vol.15(3), Mar. 1997.

Raybon, G., et al.: "A Reconfigurable Optoelectronic Wavelength Converter based on an Integrated Electroabsorption Modulated Laser Array" in 1997 Digest of the IEEE/LEOS Summer Topical Meetings, Montreal, Quebec, Canada, Aug. 1997.

Reiley, DJ, and Sasian JM: "Optical Design of a Free–Space Photonic Switching System" in Applied Optics, vol. 36(19), Jul. 1997.

Heinrich, HK: "A Noninvasive Optical Probe for Detecting Electrical Signals in Silicon Integrated Circuits", Doctoral Dissertation, Stanford Univ., (Apr., 1987).

Orobtchouk, R., et al.: "Quasi–TEoo Singlemode Optical Waveguides for Electro–optical Modulation at 1.3μm Using Standard SIMOX Material" in IEEE Proc. Optoelectron, vol. 144(2) Apr. 1997.

Soref, RA: "Electrooptical Effects of Silicon" in IEEE J of Quantum Electron. vol.QE–23(1), Jan. 1997.

Cutolo, A., et al.: "An Electrically Controlled Bragg Reflector Integrated in a Rib Silicon on Insulator Waveguide" in Appl. Phys. Sett. vol 71(2), Jul. 1997.

Silva, MTC, and Herczfeld PR: "Optical Intensity Modulator Based on Electrically Induced Periodic Structrue" Optoelectronics and Systems Research Laboratory, Sao Paulo & Center for Microwave and Lightwave Engineering, Drexel Univ., Philadelphia, PA. No Date Available.

Kuwamura, Y. et al.: "Analysis of Operating Mechanism in Semiconductor Optical Modulator with Electron–Depleting Absorption Control" in Electronics and Communications in Japan, vo. 79(5), Dec. 1995.

Liu, MY and Chou, SY: "High–Modulation–Depth and Short–Cavity–Length Silicon Fabry–Perot Modulator with Two Grating Bragg Reflectors" in Appl. Phys. Lett. vol. 68(2), Jan. 1996.

Koren, U., et al.: "A Polarization Insensitive Semiconductor Optical Amplifier with Integrated Electroabsorption Modulators" in Integrated Photonics Research, Apr. 29–May 2, 1996 Technical Digest Series, vol. 6, 1996.

Krishnamoorthy, AV, and Miller, DABM: "Free–Space Optical Interconnections for VLSI Systems: A Technology Roadmap", Conference Proceedings Leos '96 9th Annual Meeting U IEEE Lasers and Electro–Optics (vol.1,), Nov. 1996.

Goosen, KW: "GaAs MQW Modulators Integrated With Silicon CMOS" in IEEE Photonics Technology Letters, vol.7(4), Apr. 1995.

Wang, C. et al.: "Ultrafast, All–Silicon Light Modulator," Optics Letter, 19(18), Sep. 1994.

Tada, K. and Okada, Y: "Bipolar Transistor Carrier–Injected Optical Modulator/Switch: Proposal and Analysis," IEEE Electr Dev Ltrs, 7(11), 1986.

Fernando, C. et al: "Si/$Si_{0.85}$/$GE_{0.15}$/Si P–I–N Waveguide Optical Intensity Modulator," SPIE, vol. 2402(131), 1995.

Alping, A et al.: "Highly Efficient Waveguide Phase Modulator for Integrated Optoelectronics," Appl. Phys. Lett., 48(19), May 1986.

Levitan, SP et al.: "Computer–Aided Design of Free–Space Opto–Electronic Systems," DAC 97, Anaheim, California (1997).

Goodman, JW et al.: "Optical Interconnections for VLSI Systems," Proc.IEEE, 72(7), Jul. 1984.

* cited by examiner

METHOD AND APPARATUS FOR OPTICALLY MODULATING AN OPTICAL BEAM WITH A MULTI-PASS WAVE-GUIDED OPTICAL MODULATOR

BACKGROUND OF THE INVENTION

1. Field of the Invention

The present invention relates generally to integrated circuits and, more specifically, the present invention relates to the modulation of light using integrated circuits.

2. Background Information

Within the integrated circuit industry there is a continuing effort to increase integrated circuit speed as well as device density. One challenge that integrated circuit designers face with increasing circuit speeds and device densities is the increasingly significant propagation delays of circuit inputs and outputs due to the capacitive loading associated with off chip circuit connections. At slower clock speeds, the capacitive loading on integrated circuit lines is generally not a significant factor. However, as newer integrated circuit design clock speeds continue to climb towards the gigahertz range and beyond, it is evident that one of the major bottlenecks for future integrated circuits, such as for example but not limited to microprocessors, off chip caches, controllers, etc., will be the input/output bandwidth and/or round trip delay between and within chips.

Prior art attempts to address the capacitive loading problems associated with increased integrated circuit speeds and device densities have resulted in the use of larger and more powerful integrated circuit input/output drivers on the chip. Undesirable consequences of utilizing larger input/output drivers include the facts that the larger input/output drivers generally consume more power, create large di/dt noise, which requires low inductance packaging and large amount of on-die decoupling capacitance to provide a means of noise suppression, dissipate more heat and occupy more of valuable area on the integrated circuit die than smaller integrated circuit input/output drivers.

Other prior art attempts to overcome traditional integrated circuit interconnection limitations have included the use of optical interconnections. The prior art attempts at optical interconnections between integrated circuits have generally involved or have been based on two typical approaches.

One approach has been based on either using gallium arsenide (GaAs) laser diodes and modulating or switching the diodes electrically or by using GaAs built modulators that amplitude modulate a laser beam passing through the integrated circuit. The modulation is generally based on electroabsorption through strained multi-layer grown molecular beam epitaxy (MBE) films in GaAs integrated circuits. As can be appreciated to those skilled in the art, it is difficult and therefore impractical to integrate or combine III-V based technology, which includes GaAs, with standard silicon based complementary metal oxide semiconductor (CMOS) technology.

The second typical prior art approach is based on using silicon based optical waveguides. These waveguides are generally built using Silicon-on-Insulator (SOI) based processing techniques. Prior art SOI based modulators utilize silicon waveguide structures to switch light passing through the optical waveguide. The switching mechanism however utilizes injection of carriers into the waveguide rather like in a bipolar based transistor. One consequence of this is slow speed, for example up to several hundred megahertz, and very high power consumption, for example 10 mW or more for a single switch. In order to increase the modulation depth, one often tries to obtain a large interaction volume between the injected charge and the optical beam. This is generally accomplished by making very long waveguides, for example on order of thousands of microns, thereby increasing the interaction length through which the optical beam travels. As can be appreciated to those skilled in the art, actual incorporation of SOI waveguides into existing multi-layer standard CMOS based processing however is not straight forward. Hence, utilization of these waveguide structures becomes quite impractical when used for high speed input/output in large transistor count microprocessors.

SUMMARY OF THE INVENTION

A method and an apparatus of an optical modulator are disclosed. In one embodiment, an optical modulator includes a charged region disposed in a semiconductor substrate of an integrated circuit die. A first deflector is disposed proximate to the charged region. The first deflector is to deflect an optical beam directed through the charged region back through the charged region. A second deflector is disposed opposite the first deflector. The second deflector to deflect the optical beam deflected away from the first deflector back through the charged region to the first deflector. The optical beam is to be directed away from the optical modulator after a plurality of deflections of the optical beam through the charged region between the first and second deflectors. Additional features and benefits of the present invention will become apparent from the detailed description, figures and claims set forth below.

BRIEF DESCRIPTION OF THE DRAWINGS

The present invention is illustrated by way of example and not limitation in the accompanying figures.

DETAILED DESCRIPTION

A method and an apparatus providing an optical modulator is disclosed. In the following description numerous specific details are set forth in order to provide a thorough understanding of the present invention. It will be apparent, however, to one having ordinary skill in the art that the specific detail need not be employed to practice the present invention. In other instances, well-known materials or methods have not been described in detail in order to avoid obscuring the present invention.

The present invention provides an optical modulator that enables integrated circuit signals to be extracted from integrated circuit output circuit nodes through the back side of the semiconductor substrate of a integrated circuit die. In one embodiment, an optical modulator is disposed within a flip chip packaged integrated circuit die.

In one embodiment, an optical beam is directed through the back side of a semiconductor substrate of an integrated circuit die. The optical beam is directed through a charged region in the semiconductor substrate. The charge distribution of free charge carriers in charged region is modulated in response to an electrical signal originating from, for example, an output node of a circuit in the integrated circuit die. In one embodiment, circuitry of the integrated circuit die is located towards the front side of the integrated circuit die. The optical beam is deflected off a first deflector back through the charged region. A second deflector deflects the optical beam that was deflected off the first deflector back through the charged region back to the first deflector. After a plurality of deflections of the optical beam through the charged region between the first and second deflectors, the optical beam is deflected out through the back side of the semiconductor substrate of the integrated circuit die.

Figure 1:
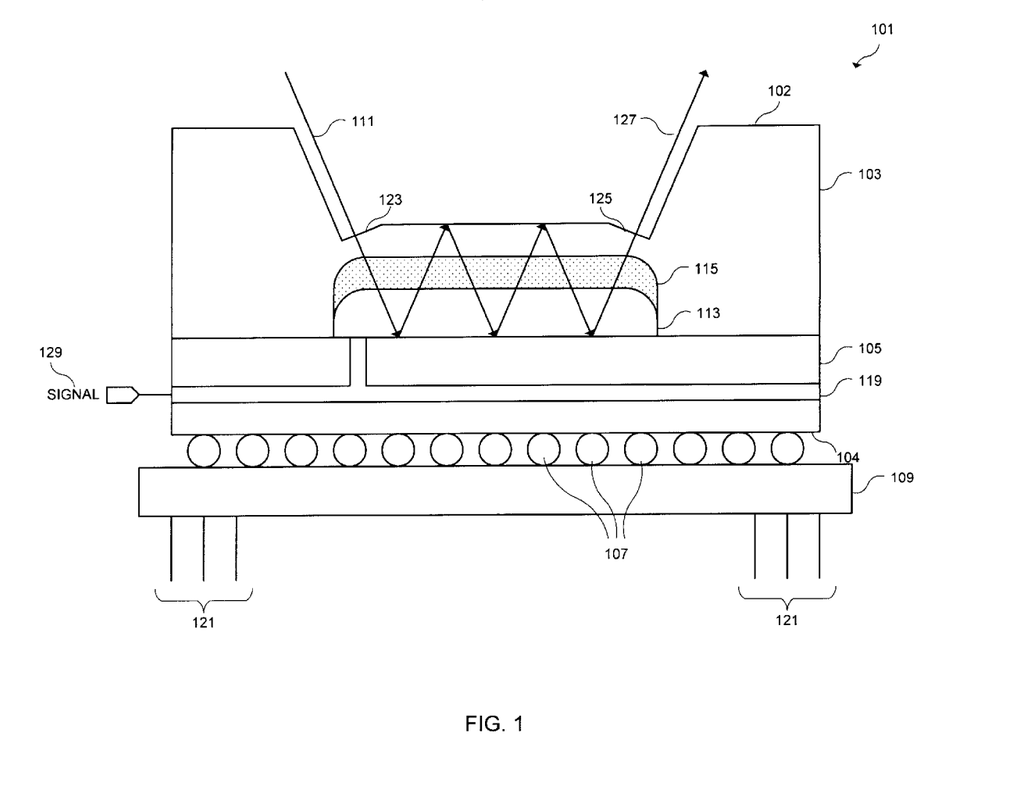
FIG. 1 is an illustration of a cross section of one embodiment of a flip chip packaged integrated circuit die including an optical modulator using a p-n junction charged region and total internal reflection to modulate an optical beam in accordance with the teachings of the present invention.

To illustrate, FIG. 1 shows one embodiment of an integrated circuit die 101 including an optical modulator in accordance with the teachings of the present invention. In one embodiment, integrated circuit die 101 is a controlled collapse chip connection (C4) or flip chip packaged integrated circuit die coupled to package substrate 109 through ball bonds 107. As can be appreciated by those skilled in the art, ball bonds 107 provide more direct connections between the internal integrated circuit nodes of integrated circuit die 101 and the pins 121 of package substrate 109, thereby reducing inductance problems associated with typical wire bond integrated circuit packaging technologies. In one embodiment, the internal integrated circuit nodes of integrated circuit die 101 are located towards the front side 104 of integrated circuit die 101. Another characteristic of flip chip packaging is that full access to the back side 102 of integrated circuit die 101 is provided. It is appreciated that in other embodiments, integrated circuit die 101 is not limited to being mounted in a flip chip packaged configuration.

In one embodiment, the optical modulator of the present invention includes modulation region disposed within the semiconductor substrate 103 including a charged region 115. In one embodiment, charged region 115 is provided using a p-n junction formed with doped region 113 in semiconductor substrate 103. In one embodiment, doped region 113 is electrically addressable and switchable.

In one embodiment, doped region 113 is an n-type doped silicon region in a p-type silicon semiconductor substrate 103. In another embodiment, doped region 113 is a p-type doped silicon region in an n-type silicon substrate 103. It is appreciated that the present invention covers the types of devices described herein as well as devices including dopants of opposite polarities. For instance, the present invention covers both n-channel and p-channel device structures. Moreover, for purposes of this disclosure, it is appreciated that the term "substrate" covers layers of the semiconductor substrate including for example well regions, epitaxy layers, or the like. Therefore, a p-n junction of the present invention may exist, for example, in the semiconductor substrate, an n well in a p substrate, a p well in an n substrate, an n epitaxy layer, a p epitaxy layer, etc., in accordance with the teachings of the present invention In one embodiment, the free charge distribution in charged region 115 is modulated in response to signal 129, which is carried by conductor 119 in insulating layer 105 to doped region 113. In one embodiment, signal 129 is a signal generated by an output node of an integrated circuit included within integrated circuit die 101. Thus, when a voltage V of signal 129 is varied on conductor 119, the free charge carrier distribution in charged region 115 is modulated. It is noted that for purposes of this disclosure, a "charged" region may be interpreted as a highly charged region having free charge carriers.

In one embodiment, an optical beam 111 is directed through back side 102 into semiconductor substrate 103. As shown in the embodiment depicted in FIG. 1, optical beam 111 is directed through charged region 115 and is deflected off a deflector formed by the interface of doped region 113 and insulator 105. In one embodiment, optical beam 111 has an angle of incidence θ relative to the interface between doped region 113 and insulator 105. For purposes of this disclosure, an incident angle θ is the angle that an optical beam makes with an imaginary line perpendicular to a surface at the point of incidence. In the embodiment depicted in FIG. 1, optical beam 111 is deflected off the interface between doped region 113 and insulator 105 because of total internal reflection. In one embodiment, the process in which the doped region 113 is formed is such that there is no silicide formed at the reflecting surface at the interface between doped region 113 and insulator 105.

In one embodiment, insulator 105 includes silicon oxide or the like and has an index of refraction of approximately $n_{oxide}=1.5$ and doped region 113 includes silicon and has an index of refraction of approximately $n_{Si}=3.5$. In order to have total internal reflection of optical beam 111, the incident angle θ of optical beam 111 relative to the interface between doped region 113 and insulator 105 satisfies the following relationship:

$$\sin \theta > n_{oxide}/n_{Si} \qquad \text{(Equation 1)}$$

As a result of the deflection, optical beam 111 is in one embodiment deflected back through charged region 115 until it is deflected off the interface at the back side 102 of semiconductor substrate 103 and air. At this interface, the incident angle θ of deflected optical beam 111 relative to the interface between semiconductor substrate 103 and air satisfies the following relationship:

$$\sin \theta > n_{air}/n_{Si} \qquad \text{(Equation 2)}$$

where the index of refraction of air $n_{air}$ is approximately equal to 1. As a result, a deflector is formed at the interface between semiconductor substrate 103 and air. This deflector is opposite the deflector formed at the interface between doped region 113 and insulator 105. As shown in the embodiment illustrated in FIG. 1, optical beam 111 is deflected through charged region 113 a plurality of times until it finally exits through the back side 102 of semiconductor substrate 103 as deflected optical beam 127.

In one embodiment, optical beam 111 includes infrared or near infrared light as silicon is partially transparent to infrared light. In one embodiment, optical beam 111 enters through the back side 102 of semiconductor substrate 103 at location 123 and deflected optical beam 127 exits through the back side 102 of semiconductor substrate at location 125. In one embodiment, the surfaces at locations 123 and 125 include anti-reflective coatings to reduce attenuation of optical beam 111 and reflected optical beam 127 due to reflections. As illustrated in the embodiment shown in FIG. 1, the surface of location 123 is angled such that the incident angle θ of optical beam 111 is reduced. Similarly, the surface of location 125 in one embodiment is angled such that the incident angle θ of deflected optical beam 127 is reduced. In one embodiment, optical beam 111 is nearly perpendicular relative to location 123 and deflected optical beam 127 is nearly perpendicular to location 125. With optical beam 111 and deflected optical beam 127 having reduced incident angles relative to locations 123 and 125, respectively, refraction at these interfaces is correspondingly reduced. As a result, a larger incident angle θ on the primary reflector (e.g. the deflector formed at the interface between doped region 113 and insulator 105 in FIG. 1) can be attained.

In one embodiment, semiconductor substrate 103 is thinned in the region proximate to charged region 115 such that the amount of semiconductor substrate 103 through which optical beam 111 passes is reduced. Thus, the distance between the interface between doped region 113 and insulator 105 and semiconductor substrate 103 and air is reduced. As a result, the amount of attenuation of optical beam 111 resulting from optical beam 111 passing through semiconductor substrate 103 is reduced. In one embodiment, semiconductor substrate 103 is thinned from back side 102 using known etching or trenching techniques or the like.

In one embodiment, optical beam 111 is modulated in response to signal 129 due to the modulation of free carrier distribution in charged region 115. In particular, the phase of optical beam 111 passing through charged region 115 is modulated due to the plasma optical effect. The plasma optical effect arises due to an interaction between the optical electric field vector and free charge carriers that may be present along the propagation path of the optical beam 111. The electric field of the optical beam 111 polarizes the free charge carriers and this effectively perturbs the local dielectric constant of the medium. This in turn leads to a perturbation of the propagation velocity of the optical wave and hence the refractive index for the light, since the refractive index is simply the ratio of the speed of the light in vacuum to that in the medium. The free charge carriers also lead to absorption of the optical field as optical energy is used up, to accelerate the free charge carriers. Generally the refractive index perturbation is a complex number with the real part being that part which causes the velocity change and the imaginary part being related to the free charge carrier absorption. The amount of phase shift φ is given by $$\phi = (2\pi/\lambda)\Delta nL \qquad \text{(Equation 3)}$$

with the optical wavelength λ and the interaction length L. In the case of the plasma optical effect, the refractive index change Δn due to the electron ($\Delta N_e$) and hole ($\Delta N_h$) concentration change is given by:

$$\Delta n = -\frac{e^2\lambda^2}{8\pi^2c^2\varepsilon_0n_0}\left(\frac{b_e(\Delta N_e)^{1.05}}{m_e^*} + \frac{b_h(\Delta N_h)^{0.8}}{m_h^*}\right) \qquad \text{(Equation 4)}$$

where $n_0$ is the nominal index of refraction for silicon, e is the electronic charge, c is the speed of light, $\varepsilon_0$ is the permittivity of free space, $m_e^*$ and $m_h^*$ are the electron and hole effective masses, respectively, $b_e$ and $b_h$ are fitting parameters. As an end result of the modulation of free charge carrier distribution in charged region 115, the intensity of deflected optical beam 127 is modulated.

It is appreciated that integrated circuit die 103, in effect, forms a multi-pass wave guided optical modulator. As can be appreciated, the total interaction length L of the optical modulator form using charged region 115 is increased in accordance with the teachings of present invention due to the multiple deflections or passes of optical beam 111 through charged region 115. As a result, the modulation depth of the optical modulator form with charged region 115 is increased relative to an optical modulator having a charged region through which the optical beam passes through only twice.

In one embodiment, optical beam 111 and/or deflected optical beam 127 are directed into and out from semiconductor substrate 103 using diffractive optics (not shown) or the like. Optical beam 111 and/or deflected optical beam 127 may be directed into and out from the diffractive optics using optical fiber techniques or the like.

Figure 2:
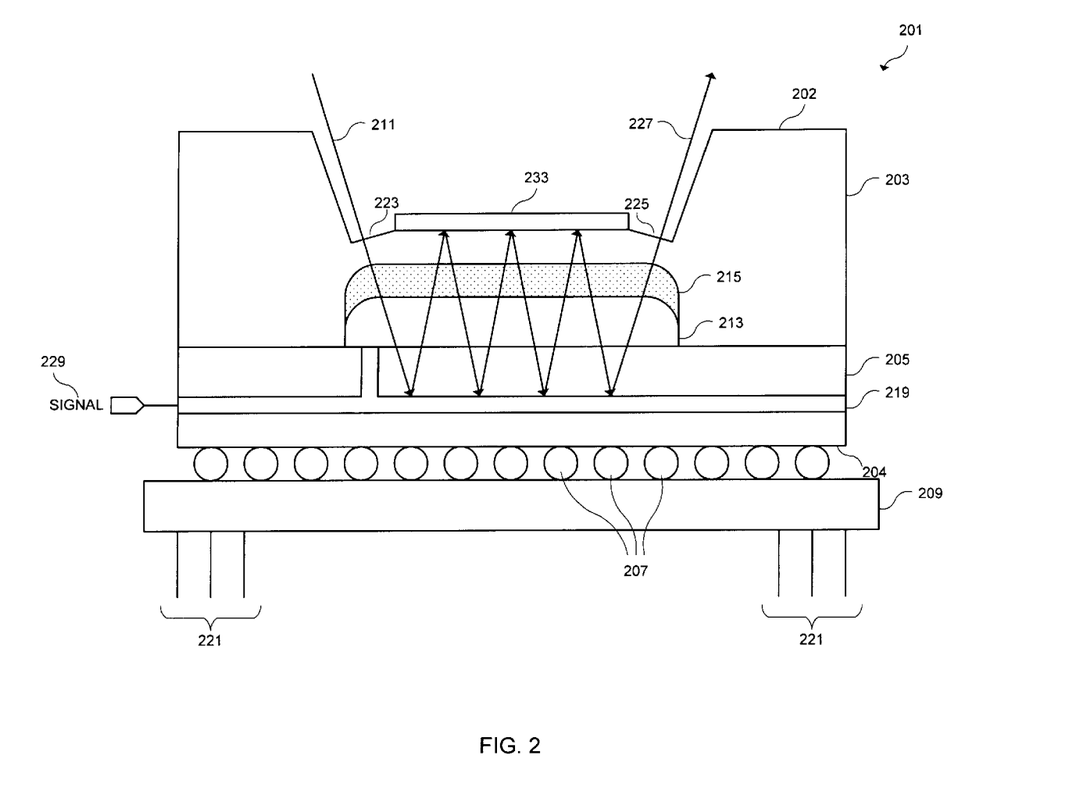
FIG. 2 is an illustration of a cross section of another embodiment of a flip chip packaged integrated circuit die including an optical modulator using a p-n junction charged region and reflective materials to modulate an optical beam in accordance with the teachings of the present invention.

FIG. 2 is an illustration of a cross section of another embodiment of a flip chip packaged integrated circuit die 201 including an optical modulator using a p-n junction charged region and reflective materials to modulate an optical beam 211 in accordance with the teachings of the present invention. Similar to the integrated circuit die 101 of FIG. 1, integrated circuit die 201 is illustrated in a flip chip configuration and is coupled to package substrate 209 through ball bonds 207 to provide more direct connections between the internal integrated circuit nodes of integrated circuit die 201 and the pins 221 of package substrate 209. In one embodiment, the internal integrated circuit nodes of integrated circuit die 201 are located towards the front side 204 of integrated circuit die 201. It is appreciated that in other embodiment, integrated circuit die 201 is not limited to being mounted in a flip chip packaged configuration in accordance with the teachings of the present invention.

Similar to the integrated circuit die 101, the optical modulator in integrated circuit die 201 of FIG. 2 includes a modulation region disposed within the semiconductor substrate 203 including a charged region 215. In one embodiment, charged region 215 is provided using a p-n junction formed with doped region 213 in semiconductor substrate 203. In one embodiment, doped region 213 is electrically addressable and switchable. In one embodiment, doped region 213 is an n-type doped silicon region in a p-type silicon semiconductor substrate 203. In another embodiment, doped region 213 is a p-type doped silicon region in an n-type silicon substrate 203. In one embodiment, the free charge distribution in charged region 215 is modulated in response to signal 229, which is carried by conductor 219 in insulating layer 205 to doped region 213. In one embodiment, signal 229 is a signal generated by an output node of an integrated circuit included within integrated circuit die 201.

In the embodiment illustrated in FIG. 2, an optical beam 211 is directed through back side 202 into semiconductor substrate 203. In one embodiment, the process in which the doped region 213 is formed is such that there is no reflective material, such as for example silicide, formed at the surface at the interface between doped region 213 and insulator 205. As shown, optical beam 211 is directed through charged region 215 and insulator 205 and is deflected off a deflector formed by conductor 219. In one embodiment, conductor 219 is formed with a reflective material, such as for example metal or the like. As a result of the deflection, optical beam 211 is in one embodiment deflected back through charged region 215 until it is deflected off deflector 233, which is disposed opposite conductor 219 on the back side 202 of semiconductor substrate 203. In one embodiment, deflector 233 is formed with a reflective material, such as for example metal or the like. As shown in the embodiment illustrated in FIG. 2, optical beam 211 is deflected through charged region 213 a plurality of times until it finally exits through the back side 202 of semiconductor substrate 203 as deflected optical beam 227.

In one embodiment, optical beam 211 includes infrared or near infrared light as silicon is partially transparent to infrared light. In one embodiment, optical beam 211 enters through the back side 202 of semiconductor substrate 203 at location 223 and deflected optical beam 227 exits through the back side 202 of semiconductor substrate at location 225. In one embodiment, the surfaces at locations 223 and 225 as well as the surface under deflector 233 include anti-reflective coatings to reduce attenuation of optical beam 211 and reflected optical beam 227 due to reflections. As illustrated in the embodiment shown in FIG. 2, the surface of location 223 is angled such that the incident angle θ of optical beam 211 is reduced. Similarly, the surface of location 225 in one embodiment is angled such that the incident angle θ of deflected optical beam 227 is reduced. In one embodiment, optical beam 211 is nearly perpendicular relative to location 223 and deflected optical beam 227 is nearly perpendicular to location 225.

In one embodiment, optical beam 211 and/or deflected optical beam 227 are directed into and out from semiconductor substrate 203 using diffractive optics (not shown) or the like. Optical beam 211 and/or deflected optical beam 227 may be directed into and out from the diffractive optics using optical fiber techniques or the like.

In the embodiment illustrated in FIG. 2, total internal reflection does not occur at the interface between doped region 213 and insulator 205 because of the relatively small angle of incidence θ of optical beam 211. Therefore, optical beam 211 in the embodiment illustrated in FIG. 2 is a directed at the interface between doped region 213 and insulator 205 at a steeper angle compared to the embodiment illustrated in FIG. 1. An advantage with the embodiment illustrated in FIG. 2 is that there is no minimum angle of incidence θ for optical beam 211 integrated circuit die 201 can therefore be designed with a smaller lateral dimension allowing the same or greater number of deflections of optical beam 211 through charged region 215.

In one embodiment, semiconductor substrate 203 is thinned in the region proximate to charged region 215 such that the amount of semiconductor substrate 203 through which optical beam 211 passes is reduced. Thus, the distance between the deflector formed with conductor 219 and deflector 233 is reduced. As a result, the amount of attenuation of optical beam 211 resulting from optical beam 211 passing through semiconductor substrate 203 is reduced. In one embodiment, semiconductor substrate 203 is thinned from back side 202 using known etching or trenching techniques or the like.

Figure 3:
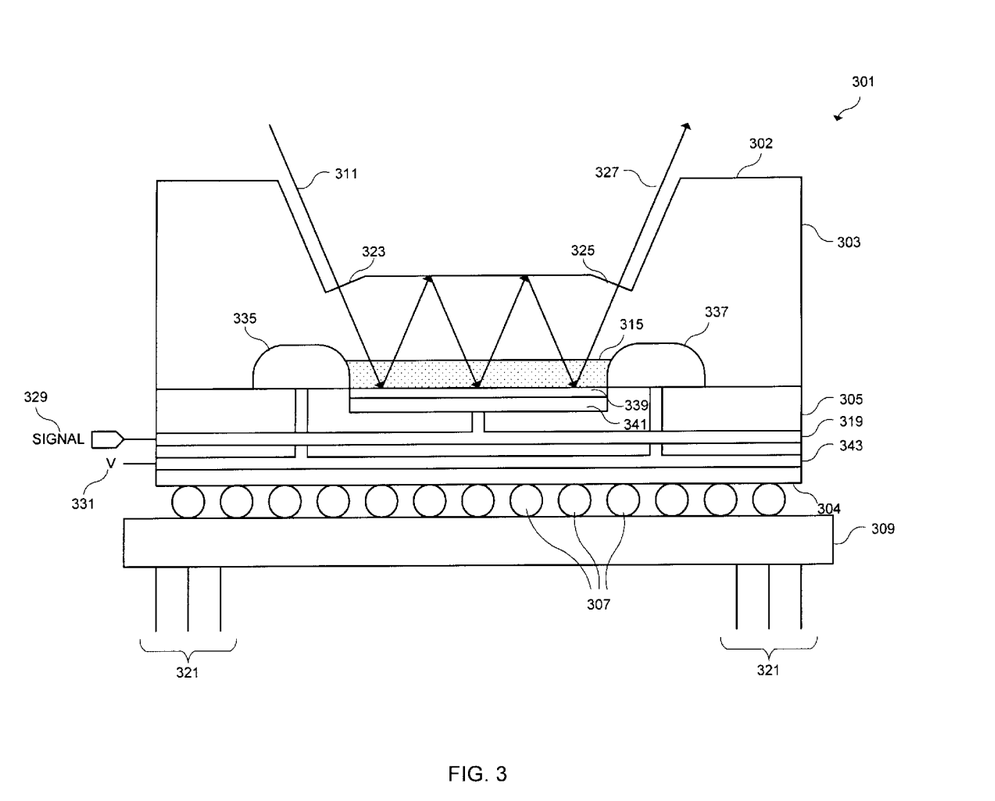
FIG. 3 is an illustration of a cross section of yet another embodiment of a flip chip packaged integrated circuit die including an optical modulator using a metal-oxide-semiconductor (MOS) type structure charged region and total internal reflection to modulate an optical beam in accordance with the teachings of the present invention.

FIG. 3 is an illustration of a cross section of yet another embodiment of a flip chip packaged integrated circuit die 301 including an optical modulator using a metal-oxide-semiconductor (MOS) type structure charged region and total internal reflection to modulate an optical beam 311 in accordance with the teachings of the present invention. It is appreciated that the present invention is not limited to the use of an actual metal for MOS type structures. For example, in a MOS capacitor structure, a polysilicon gate or the like may be used instead of a metal gate in accordance with the teachings of the present invention. As will be discussed, the optical modulator in integrated circuit die 301 illustrated in FIG. 3 is similar to the optical modulator in integrated circuit die 101 illustrated in FIG. 1 with the exception of charged region 315 in integrated circuit die 301 being formed using a MOS structure instead of a p-n junction structure.

Similar to the integrated circuit die 101, integrated circuit die 301 of FIG. 3 is illustrated in a flip chip configuration and is coupled to package substrate 309 through ball bonds 307 to provide more direct connections between the internal integrated circuit nodes of integrated circuit die 301 and the pins 321 of package substrate 309. In one embodiment, the internal integrated circuit nodes of integrated circuit die 301 are located towards the front side 304 of integrated circuit die 301. It is appreciated that in other embodiment, integrated circuit die 301 is not limited to being mounted in a flip chip packaged configuration.

Similar to the integrated circuit die 101, the optical modulator in integrated circuit die 301 of FIG. 3 includes modulation region disposed within the semiconductor substrate 303 including a charged region 315. In one embodiment, charged region 315 is formed using integrated circuit devices such as transistors coupled as metal oxide semiconductor field effect transistor (MOSFET) capacitors with source and drain regions shorted together. For instance, FIG. 3 shows source/drain regions 335 and 337 disposed in the semiconductor substrate 303. Source/drain regions 335 and 337 are shorted together through conductor 343. In one embodiment, a polysilicon gate 341 is disposed in insulator 305 between source/drain regions 335 and 337. As shown, a gate insulator 339 is disposed between semiconductor substrate 303 and gate 341. In one embodiment, the source/drain regions 335 and 337 are commonly coupled through conductor 343 to a common potential V, such as for example ground for n channel MOSFETs or $V_{cc}$ for p channel MOSFETs. In another embodiment, potential V is $V_{cc}$ for n channel MOSFETs and ground for p channel MOSFETs. In still another embodiment, source and drain are coupled to different potentials. In one embodiment, gate 341 is electrically addressable and switchable. In one embodiment gate 341 is coupled to receive signal 329 through conductor 319.

In operation, with the commonly coupled source/drain regions 335 and 337 coupled to the common potential V and gate 341 coupled to signal 329, a highly charged inversion layer is formed in charged region 315, which is disposed between the source/drain regions 335 and 337 in semiconductor substrate 303. The free charge carrier distribution in charged region 315 is modulated in response to signal 329. In one embodiment, signal 329 is a signal generated by an output node of an integrated circuit included within integrated circuit die 301. In one embodiment source/drain regions 335 and 337 include $N^+$ doped regions disposed in a P-type semiconductor substrate 103. In another embodiment, source/drain regions 335 and 337 include P+ doped regions disposed in an N-type semiconductor substrate 103. In one embodiment, capacitor structures are utilized instead of MOS transistor structures as the non-mobile inversion layer in the MOSFET capacitor channel is used to modulate the optical beam 311.

As illustrated in FIG. 3, optical beam 311 is directed through back side 302 into semiconductor substrate 303. As shown, optical beam 311 is directed through charged region 315 and is deflected off a deflector formed by the interface of semiconductor substrate 303 and gate insulator 339. In one embodiment, optical beam 311 has an angle of incidence θ relative to the interface between semiconductor substrate 303 and gate insulator 339 such that optical beam 311 is deflected off the interface between semiconductor substrate 303 and gate insulator 339 because of total internal reflection.

As a result of the deflection, optical beam 311 is in one embodiment deflected back through charged region 315 until it is deflected off the interface at the back side 302 of semiconductor substrate 303 and air. At this interface, the incident angle θ of deflected optical beam 311 is such that it is deflected off back side 302 at the interface between semiconductor substrate 303 and air because of total internal reflection. As a result, a deflector is formed at the interface between semiconductor substrate 303 and air. This deflector is opposite the deflector formed at the interface between semiconductor substrate 303 and gate insulator 339. Thus, optical beam 311 is deflected back through charged region 315 a plurality of times until it finally exits through the back side 302 of semiconductor substrate 303 as deflected optical beam 327.

In one embodiment, optical beam 311 includes infrared or near infrared light as silicon is partially transparent to infrared light. In one embodiment, optical beam 311 enters through the back side 302 of semiconductor substrate 303 at location 323 and deflected optical beam 327 exits through the back side 302 of semiconductor substrate at location 325. In one embodiment, the surfaces at locations 323 and 325 include anti-reflective coatings to reduce attenuation of optical beam 311 and reflected optical beam 327 due to reflections. As illustrated in the embodiment shown in FIG. 3, the surface of location 323 is angled such that the incident angle θ of optical beam 311 is reduced. Similarly, the surface of location 325 in one embodiment is angled such that the incident angle θ of deflected optical beam 327 is reduced. In one embodiment, optical beam 311 is nearly perpendicular relative to location 323 and deflected optical beam 327 is nearly perpendicular to location 325.

In one embodiment, semiconductor substrate 303 is thinned in the region proximate to charged region 315 such that the amount of semiconductor substrate 303 through which optical beam 311 passes is reduced. Thus, the distance between the interface between semiconductor substrate 303 and gate insulator 339 and semiconductor substrate 303 and air is reduced. As a result, the amount of attenuation of optical beam 311 resulting from optical beam 311 passing through semiconductor substrate 303 is reduced. In one embodiment, semiconductor substrate 303 is thinned from back side 302 using known etching or trenching techniques or the like.

In one embodiment, optical beam 311 and/or deflected optical beam 327 are directed into and out from semiconductor substrate 303 using diffractive optics (not shown) or the like. Optical beam 311 and/or deflected optical beam 327 may be directed into and out from the diffractive optics using optical fiber techniques or the like.

Figure 4:
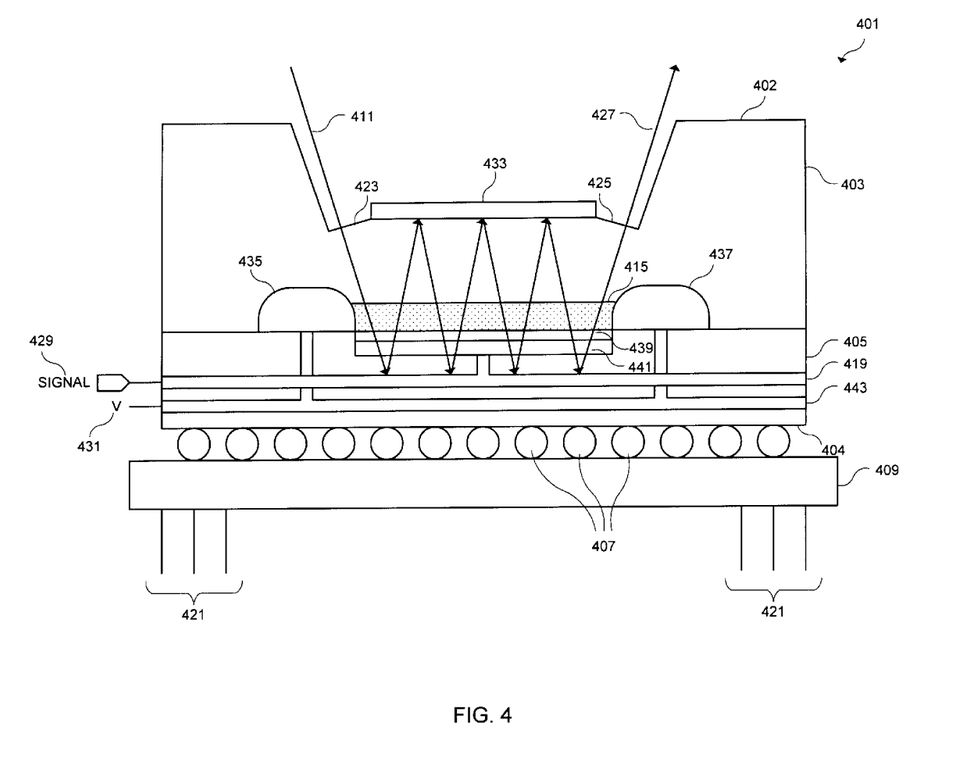
FIG. 4 is an illustration of a cross section of another embodiment of a flip chip packaged integrated circuit die including an optical modulator using a MOS type structure charged region and reflective materials to modulate an optical beam in accordance with the teachings of the present invention.

FIG. 4 is an illustration of a cross section of another embodiment of a flip chip packaged integrated circuit die 401 including an optical modulator using a MOS type structure charged region and reflective materials to modulate an optical beam 401 in accordance with the teachings of the present invention. Similar to the integrated circuit die 301, integrated circuit die 401 of FIG. 4 is illustrated in a flip chip configuration and is coupled to package substrate 409 through ball bonds 407 to provide more direct connections between the internal integrated circuit nodes of integrated circuit die 401 and the pins 421 of package substrate 409. In one embodiment, the internal integrated circuit nodes of integrated circuit die 401 are located towards the front side 404 of integrated circuit die 401. It is appreciated that in other embodiment, integrated circuit die 401 is not limited to being mounted in a flip chip packaged configuration in accordance with the teachings of the present invention.

Similar to the integrated circuit die 301, the optical modulator in integrated circuit die 401 of FIG. 4 includes modulation region disposed within the semiconductor substrate 403 including a charged region 415. In one embodiment, charged region 415 is provided using a MOSFET capacitor or capacitor structure. FIG. 4 shows a MOSFET capacitor including source/drain regions 435 and 437 disposed in the semiconductor substrate 403, which are shorted together through conductor 443. In one embodiment, the source/drain regions 435 and 437 are commonly coupled through conductor 343 to a common potential V. In one embodiment, a polysilicon gate 441 is disposed in insulator 405 between source/drain regions 435 and 437. As shown, a gate insulator 439 is disposed between semiconductor substrate 403 and gate 441. In one embodiment, gate 441 is electrically addressable and switchable. In one embodiment gate 441 is coupled to receive signal 429 through conductor 419.

Operation of the optical modulator in integrated circuit die 401 is similar to the operation of the optical modulator in integrated circuit die 301. In particular, with the commonly coupled source/drain regions 435 and 437 coupled to the common potential V and gate 441 coupled to signal 429, a highly charged inversion layer is formed in charged region 415, which is disposed between the source/drain regions 435 and 437 in semiconductor substrate 403. The free charge carrier distribution in charged region 415 is modulated in response to signal 429. In one embodiment, signal 429 is a signal generated by an output node of an integrated circuit included within integrated circuit die 401.

As illustrated in FIG. 4, optical beam 411 is directed through back side 402 into semiconductor substrate 403. As shown, optical beam 411 is directed through charged region 415, through gate insulator 439, through polysilicon gate 441 and is deflected off a deflector formed by conductor 419. In one embodiment, conductor 419 is formed with a reflective material, such as for example metal or the like. As a result of the deflection, optical beam 411 is in one embodiment deflected back through charged region 415 until it is deflected off deflector 433, which is disposed opposite of conductor 419 on the back side 402 of semiconductor substrate 403. In one embodiment, deflector 433 is formed with a reflective material, such as for example metal or the like. As shown in the embodiment illustrated in FIG. 4, optical beam 411 is deflected through charged region 413 a plurality of times until it finally exits through the back side 402 of semiconductor substrate 403 as deflected optical beam 427.

In one embodiment, optical beam 411 includes infrared or near infrared light as silicon is partially transparent to infrared light. In one embodiment, optical beam 411 enters through the back side 402 of semiconductor substrate 403 at location 423 and deflected optical beam 427 exits through the back side 402 of semiconductor substrate at location 425. In one embodiment, the surfaces at locations 423 and 425 as well as the surface under deflector 433 include anti-reflective coatings to reduce attenuation of optical beam 411 and reflected optical beam 427 due to reflections. As illustrated in the embodiment shown in FIG. 4, the surface of location 423 is angled such that the incident angle θ of optical beam 411 is reduced. Similarly, the surface of location 425 in one embodiment is angled such that the incident angle θ of deflected optical beam 427 is reduced. In one embodiment, optical beam 411 is nearly perpendicular relative to location 423 and deflected optical beam 427 is nearly perpendicular to location 425.

In one embodiment, semiconductor substrate 403 is thinned in the region proximate to charged region 415 such that the amount of semiconductor substrate 403 through which optical beam 411 passes is reduced. Thus, the distance between the deflector formed with conductor 419 and deflector 433 is reduced. As a result, the amount of attenuation of optical beam 411 resulting from optical beam 411 passing through semiconductor substrate 403 is reduced. In one embodiment, semiconductor substrate 403 is thinned from back side 402 using known etching or trenching techniques or the like.

In one embodiment, optical beam 411 and/or deflected optical beam 427 are directed into and out from semiconductor substrate 403 using diffractive optics (not shown) or the like. Optical beam 411 and/or deflected optical beam 427 may be directed into and out from the diffractive optics using optical fiber techniques or the like.

In the embodiment illustrated in FIG. 4, total internal reflection does not occur at the interface between semiconductor substrate 403 and insulator gate insulator 439 because of the relatively small angle of incidence θ of optical beam 411.

In the foregoing detailed description, the method and apparatus of the present invention has been described with reference to specific exemplary embodiments thereof. It will, however, be evident that various modifications and changes may be made thereto without departing from the broader spirit and scope of the present invention. The present specification and figures are accordingly to be regarded as illustrative rather than restrictive.

What is claimed is:

1. An optical modulator, comprising:
   a charged region disposed in a semiconductor substrate of an integrated circuit die;
   a first deflector disposed proximate to the charged region, the first deflector to deflect an optical beam directed through the charged region back through the charged region; and
   a second deflector disposed opposite the first deflector, the second deflector to deflect the optical beam deflected away from the first deflector back through the charged region to the first deflector, the optical beam to be directed away from the optical modulator after a plurality of deflections of the optical beam through the charged region between the first and second deflectors.

2. The optical modulator of claim 1 wherein the semiconductor substrate comprises a back side and a front side, the optical beam to be directed into the semiconductor substrate through the back side of the semiconductor substrate.

3. The optical modulator of claim 2, wherein the optical beam is to be directed through the back side away from the optical modulator after the plurality of deflections.

4. The optical modulator of claim 3 wherein the optical beam is to enter the semiconductor substrate at a first location on the back side of the semiconductor substrate, the optical beam to exit the semiconductor substrate at a second location on the back side of the semiconductor substrate, the first location separate from the second location.

5. The optical modulator of claim 4 wherein a surface of the back side of semiconductor substrate at the first location is angled to reduce an incident angle of the optical beam at the first location, wherein a surface of the back side of semiconductor substrate at the second location is angled to reduce an incident angle of the optical beam at the second location.

6. The optical modulator of claim 1 wherein the first deflector comprises a first interface of the semiconductor substrate with a material having an index of refraction different than an index of refraction of the semiconductor substrate, the optical beam to be deflected from the first deflector as a result of total internal reflection.

7. The optical modulator of claim 1 wherein the first deflector comprises a reflective material proximate to the semiconductor substrate.

8. The optical modulator of claim 1 wherein the second deflector comprises a second interface of the semiconductor substrate with a material having an index of refraction different than an index of refraction of the semiconductor substrate, the optical beam to be deflected from the second deflector as a result of total internal reflection.

9. The optical modulator of claim 1 wherein the second deflector comprises a reflective material proximate to the semiconductor substrate.

10. The optical modulator of claim 1 wherein free charge carrier distribution in the charged region is to be modulated in response to a signal in the integrated circuit die.

11. The optical modulator of claim 1 wherein the charged region is proximate to a p-n junction in the semiconductor substrate of the integrated circuit die.

12. The optical modulator of claim 1 wherein the charged region is proximate to a metal-oxide-semiconductor (MOS) interface in the semiconductor substrate of the integrated circuit die.

13. The optical modulator of claim 1 wherein the semiconductor substrate is thinned between the first and second deflectors to reduce attenuation of the optical beam.

14. A method of modulating an optical beam, comprising:
   directing the optical beam through a charged region disposed in a semiconductor substrate of an integrated circuit die; and
   deflecting the optical beam back through the charged region a plurality of times such that the optical beam is passed more than once through the charged region prior to exiting the semiconductor substrate.

15. The method of modulating the optical beam of claim 14 further comprising modulating free charge carrier distribution in the charged region in response to a signal in the integrated circuit die.

16. The method of modulating the optical beam of claim 14 wherein deflecting the optical beam back through the charged region the plurality of times comprises:
   deflecting the optical beam directed through the charged region with a first deflector proximate to the charged region; and
   deflecting the optical beam deflected from the first deflector back through the charged region with a second deflector disposed opposite the first deflector.

17. The method of modulating the optical beam of claim 16 wherein deflecting the optical beam directed through the charged region with the first deflector comprises deflecting the optical beam with a reflective material disposed proximate to the semiconductor substrate.

18. The method of modulating the optical beam of claim 16 wherein deflecting the optical beam directed through the charged region with the first deflector comprises deflecting the optical beam as a result of total internal reflection within the semiconductor substrate.

19. The method of modulating the optical beam of claim 16 wherein deflecting the optical beam deflected from the first deflector back through the charged region with the second deflector comprises deflecting the optical beam with a reflective material disposed proximate to the semiconductor substrate.

20. The method of modulating the optical beam of claim 16 wherein deflecting the optical beam deflected from the first deflector back through the charged region with the second deflector comprises deflecting the optical beam as a result of total internal reflection within the semiconductor substrate.

21. The method of modulating the optical beam of claim 14 wherein the semiconductor substrate includes a front side and a back side, the optical beam to be directed to the charged region through the back side of the semiconductor substrate, the optical beam to exit the semiconductor substrate through the back side.

22. The method of modulating the optical beam of claim 19 further comprising thinning the semiconductor substrate between the first and second deflectors to reduce attenuation of the optical beam.

23. The method of modulating the optical beam of claim 21 wherein the optical beam is to be directed through the back side of the semiconductor substrate at a first location, wherein the deflected optical beam is to exit through the back side of the semiconductor substrate at a second location, the first location different than the second location.

24. The method of modulating the optical beam of claim 23 further comprising:
    angling the first location of the back side of the semiconductor substrate to reduce an incident angle of the optical beam at the first location; and
    angling the second location of the back side of the semiconductor substrate to reduce an incident angle of the deflected optical beam at the second location.

25. An optical modulator, comprising:
    a charged region disposed in a semiconductor substrate of an integrated circuit die, the semiconductor substrate having a front side and a back side;
    a first location on the back side of the semiconductor substrate through which an optical beam is to be directed through the semiconductor substrate to the charged region;
    a first deflector disposed proximate to the charged region to deflect the optical beam back through the charged region;
    a second deflector disposed opposite the first deflector to deflect the optical beam deflected through the charged region from the first deflector, the second deflector to deflect the optical beam back through the charged region; and
    a second location on the back side of the semiconductor substrate through which the optical beam is to exit the semiconductor substrate after being deflected through the charged region a plurality of times between the first and second deflectors.

26. The optical modulator of claim 25 wherein the first location is angled to reduce an incident angle of the optical beam, wherein the second location is angled to reduce an incident angle of the deflected optical beam.

27. The optical modulator of claim 26 wherein the first deflector comprises an interface between the semiconductor substrate and a material having an index of refraction different than an index of refraction of the semiconductor substrate.

28. The optical modulator of claim 26 wherein the first deflector comprises a reflective material disposed proximate to the semiconductor substrate.

29. The optical modulator of claim 26 wherein the second deflector comprises an interface between the semiconductor substrate and a material having an index of refraction different than an index of refraction of the semiconductor substrate.

30. The optical modulator of claim 26 wherein the second deflector comprises a reflective material disposed proximate to the semiconductor substrate.

* * * * *